(12) United States Patent
Nakata et al.

(10) Patent No.: US 6,786,471 B2
(45) Date of Patent: Sep. 7, 2004

(54) DIAPHRAGM VALVE

(75) Inventors: Tomohiro Nakata, Nishi-ku (JP); Michio Yamaji, Nishi-ku (JP)

(73) Assignee: Fujikin Incorporated, Osaka (JP)

( * ) Notice: Subject to any disclaimer, the term of this patent is extended or adjusted under 35 U.S.C. 154(b) by 126 days.

(21) Appl. No.: 10/178,501

(22) Filed: Jun. 25, 2002

(65) Prior Publication Data

US 2003/0025099 A1 Feb. 6, 2003

(30) Foreign Application Priority Data

Jul. 31, 2001 (JP) ........................... 2001-231031

(51) Int. Cl.[7] .................... F16K 1/00; F16K 15/00
(52) U.S. Cl. ................. 251/331; 251/360; 251/362
(58) Field of Search ......................... 251/331, 336, 251/360, 363, 362

(56) References Cited

U.S. PATENT DOCUMENTS

| 4,867,201 A | * | 9/1989 | Carten | 137/625.18 |
| 5,108,069 A | * | 4/1992 | Tada et al. | 251/58 |
| 5,215,286 A | * | 6/1993 | Kolenc | 251/58 |
| 6,105,933 A | * | 8/2000 | Kanno et al. | 251/331 |

FOREIGN PATENT DOCUMENTS

| JP | 06-094142 | 4/1994 |
| JP | 06-6193747 A | 7/1994 |
| JP | 06-314560 A | 12/1994 |

* cited by examiner

Primary Examiner—Edward K. Look
Assistant Examiner—John K. Fristoe, Jr.
(74) Attorney, Agent, or Firm—Griffin & Szipl, P.C.

(57) ABSTRACT

A diaphragm valve assembly comprising a body defining a valve chamber and first and second passageways through said, a removable, annular valve seat installed in the valve chamber around of said passageways, seat holding means comprising a seat holder shaped to surround said valve seat, a flexibly resilient diaphragm having a valve closing portion and means for holding the diaphragm in position in the valve chamber. The resilience of the diaphragm urges said valve closing portion away from the valve seat. Selectively operable driving means drive the valve closing portion of the diaphragm into contact with the valve seat for closing the valve. A protruding, cylindrical rim portion around said one passageway, and said seat holder define an annular recess adapted to receive the valve seat such that said valve seat is held between said seat holder and said rim portion.

9 Claims, 3 Drawing Sheets

DIAPHRAGM VALVE

BACKGROUND OF THE INVENTION

The present invention relates to diaphragm valve of the kind suitable for use particularly, but not exclusively, in semiconductor manufacturing equipment.

Diaphragm valves of the kind described are disclosed in JP 6-341560A, 6-193747A and 6-94142A.

FIG. 3 of the accompanying drawings is a longitudinal, sectional view showing the essential part of a diaphragm valve according to JP 6-341560A. In FIG. 3, the diaphragm valve comprises a body A defining a valve chamber B and first and second passageways through the body which, in use, serve as an inlet and an outlet for the valve chamber. The valve chamber B accommodates a flexibly resilient diaphragm C, a valve seat D and a seat holder E. The diaphragm and seat holder are held in place by means of a bonnet G, and the diaphragm is shaped such that when fitted in the valve chamber it is spaced from the valve seat D to allow fluid to flow in use between the two passageways. The bonnet G supports drive means F which are selectively operable for pressing against the diaphragm C for deforming the diaphragm and pushing it into contact with the valve seat D in order to close the valve. The valve seat D and seat holder E form an integral unit which is received in the valve chamber B.

An advantage of the diaphragm valve shown in FIG. 3 is that when the drive means are operated to press the diaphragm C against the valve seat D, the valve seat D is hardly deformed. However, a disadvantage of the diaphragm valve of JP 6-341560A is that if the valve seat D becomes damaged, then both seat D and holder E need to be replaced which may be expensive.

FIG. 4 is a longitudinal, sectional view showing the essential part of a diaphragm valve in accordance with JP 6-94142A. In the diaphragm valve of FIG. 4, the valve seat D and seat holder E are separate components which are installed separately into the valve chamber B. Thus, if seat D becomes damaged, then it is necessary only to replace seat D, leading to lower repair costs as compared with the valve of FIG. 3.

However, a disadvantage of the diaphragm valve of FIG. 4 is that when the diaphragm C is pushed against the seat D, the seat is sometimes deformed allowing fluid to leak between the body A and seat D.

As described above, the arrangements of valve seats and seat holders in the prior art diaphragm valves have both advantages and disadvantages. Accordingly, it is an object of the present invention to provide improvements in or relating to diaphragm valves of the kind described.

SUMMARY OF THE INVENTION

In particular, it is an object of the present invention to provide an improved diaphragm valve which has minimal associated repair costs and, at the same time, has no risk of leaking.

A particular object of the present invention is to provide an improved diaphragm valve in which the valve seat does not deform when pressed by the diaphragm.

According to the present invention therefore there is provided a diaphragm valve assembly comprising a body defining a valve chamber and first and second passageways through the body which, in use, serve as an inlet and outlet for the valve chamber; a removable valve seat adapted to be installed in the valve chamber around one of said passageways, seat holding means for holding the valve seat in place in the valve chamber, said seat holding means comprising a seat holder that is shaped to surround said valve seat, a flexibly resilient diaphragm having a valve closing portion and means for holding the diaphragm in position in the valve chamber, such that the valve closing portion is disposed juxtaposed the valve seat, the diaphragm being shaped that when fitted its valve closing portion is spaced from the valve seat, and selectively operable driving means for driving the valve closing portion of the diaphragm into contact with the valve seat for closing the valve; characterised in that said body includes a protruding rim portion around said one passageway, the arrangement being such that said rim portion and said seat holder define a recess adapted to receive the valve seat such that the valve seat is held between the seat holder and the rim portion.

In operation, the driving means may be operated to drive the valve closing portion of the diaphragm against the valve seat to prevent fluid flow between the two passageways. If the pressure applied to the diaphragm by the driving means is removed, then the diaphragm is allowed to return resiliently to its original shape and position such that the valve closing portion of the diaphragm moves away from the valve seat. The passageways through the body can then communicate with one another to allow fluid flow from the one passageway to the other passageway.

Advantageously, the valve seat is a separate component, independent of the body and seat holder. Thus, if the seat become damaged, then the seat alone needs replacement. It will be appreciated that this minimises the costs associated with repairing the valve.

Furthermore, the valve seat, when fitted, is held between the seat holder and rim portion which reduces the risk of deformation of the seat to nil when the diaphragm is pressed against the valve seat, thereby producing no risk of leakage between the valve seat and the body. Said valve seat is preferably annular and said rim portion is preferably cylindrical. The seat holder and rim portion preferably define an annular recess therebetween for receiving said annular valve seat. Said rim portion may have a shaped, preferably cylindrical, outer surface, and said valve seat may have a correspondingly shaped, preferably substantially cylindrical, inner surface adapted to contact the outer surface of the rim portion. The valve seat may have shaped outer surface, and the seat holder may have a correspondingly shaped inner surface adapted to contact the outer surface of the valve seat. Preferably, the valve seat forms a snug or tight fit in the annular recess defined by the rim portion and seat holder such that the valve seat is held firmly in the recess and is reinforced against deformation when the diaphragm valve is urged against the seat. In some embodiments, the valve seat may be "pinched" between the rim portion and seat holder.

Said body may define a floor surface within the valve chamber, which floor surface comprises annular seat supporting surface around the rim portion, which annular seat supporting surface is adapted to contact and support the valve seat. Said floor surface may be rebated around the seat supporting surface to form a seat bolder channel adapted to receive the seat holder Thus, the seat holder channel or groove is preferably formed deeper into the body of the diaphragm valve than the seat supporting surface of seat base. This allows the valve seat and di seat holder to be properly positioned and the valve seat to be securely held by the seat holder and the protruding rim. The seat holder may also be annular and accordingly the seat bolder channel maybe annular.

Normally, the one passageway is adapted to form the inlet in use, with the other passageway forming the outlet. The one passageway may be formed substantially centrally within the body, and the protruding rim, seat supporting surface and seat holding channel may be formed substantially concentrically with the one passageway.

Following is a description by way of example only, with reference to the accompanying drawings of embodiments of the present invention.

DETAILED DESCRIPTION OF THE INVENTION

Figure 1:
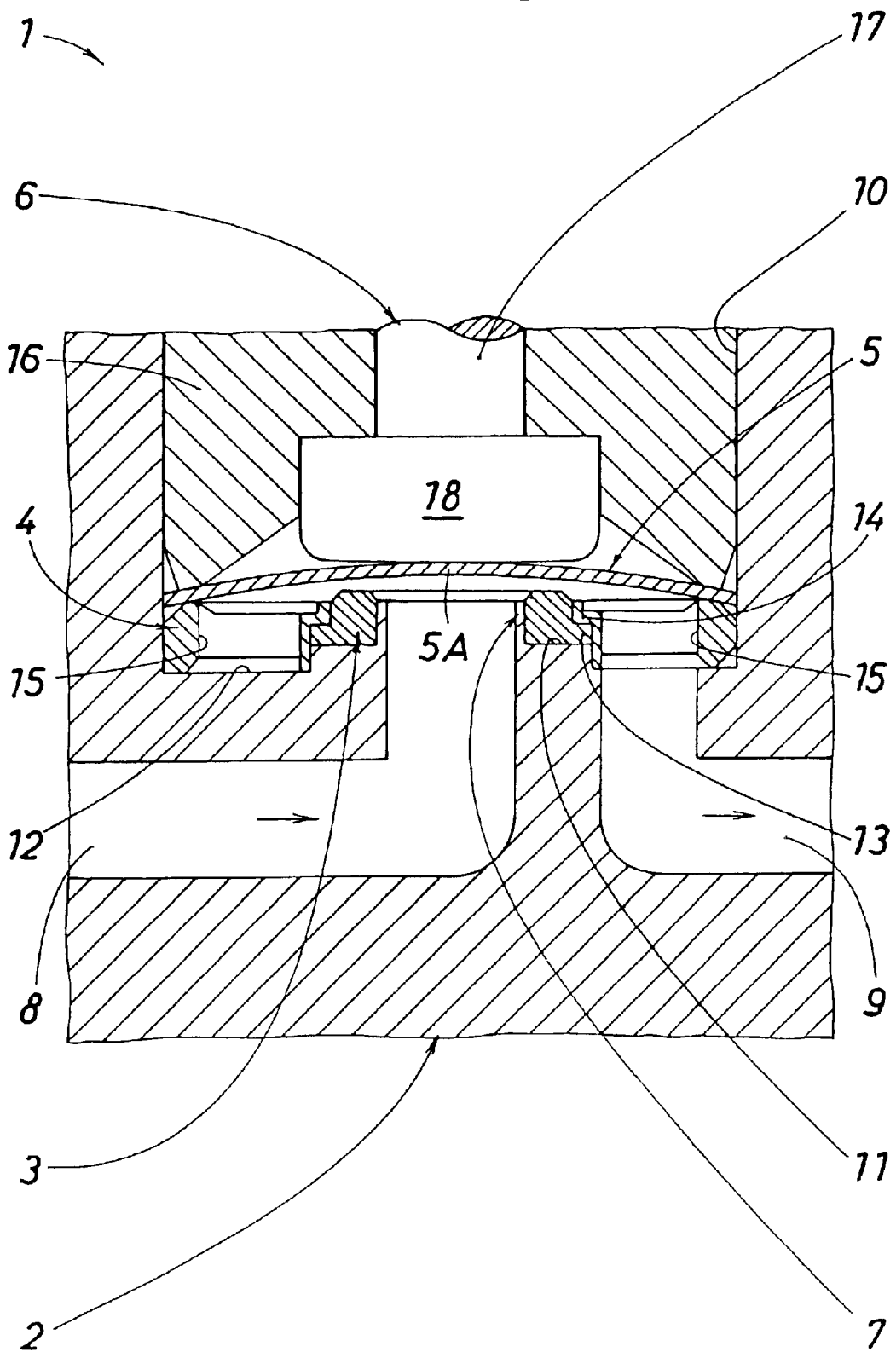
FIG. 1 is a longitudinal, sectional view showing the essential part of a diaphragm valve according to the present invention.

With reference to FIG. 1 a diaphragm valve 1 according to the present invention comprises a body 2 which may be manufactured from a metallic material such, for example, as stainless steel. The body 2 is formed with a generally cylindrical, hollow valve chamber 10 which is open at one end 10A and closed at another, opposing end 10B by a generally circular valve chamber floor surface 10C. The chamber has a substantially cylindrical inner side surface 10D. The body 2 further defines two non-interconnecting, internal passageways 8,9 which both open into the valve chamber 10 through the floor surface 10C. As can be seen, each passageway 8, 9 is generally L-shaped, and one of the passageways, indicated by reference numeral 8 in FIGS. 1 and 2, has a mouth 8A which opens into the valve chamber in a substantially central position within the valve chamber. The one passageway 8 is adapted to form an inflow path in use, whilst the other passageway is adapted to form an outflow path 9.

Figure 2:
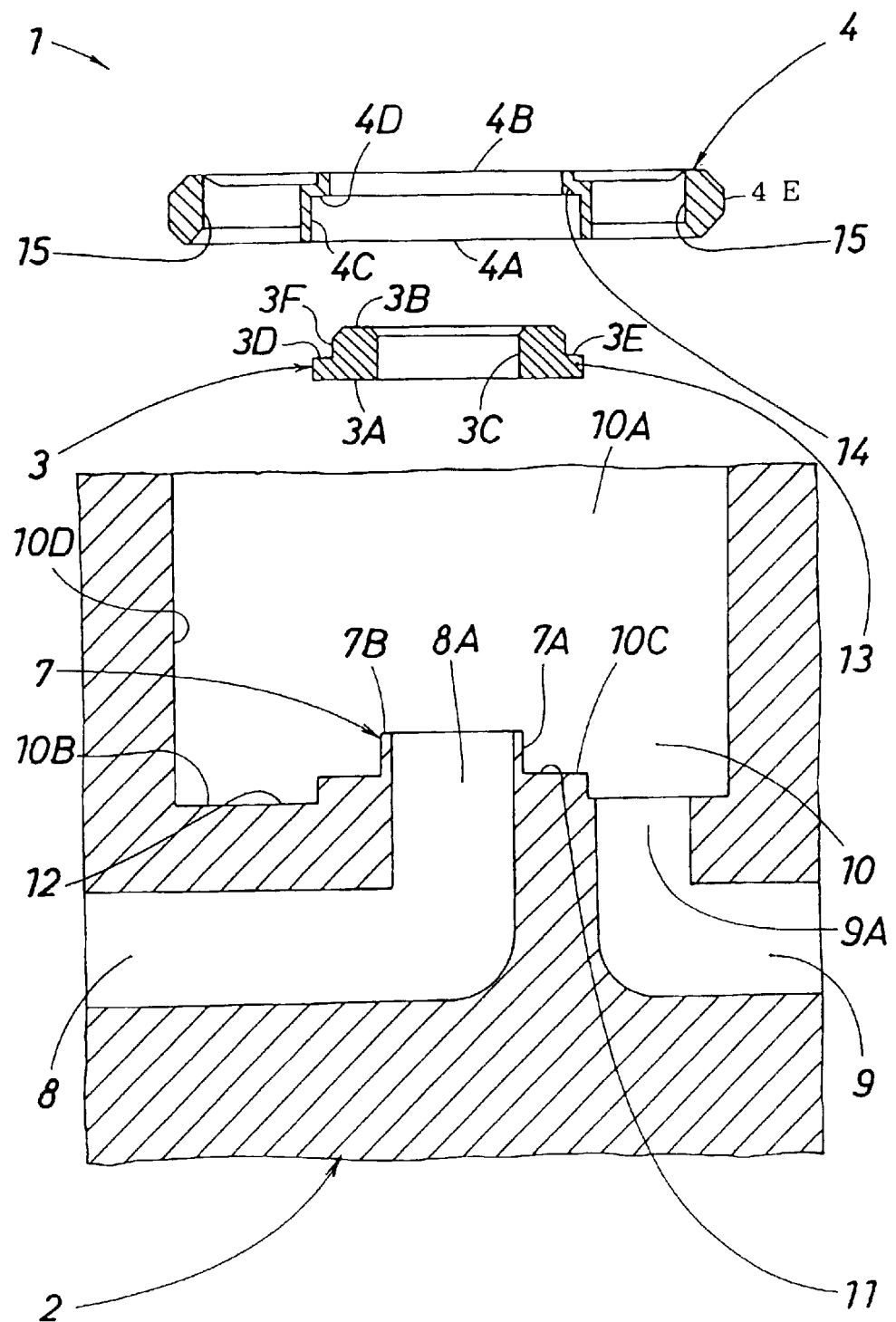
FIG. 2 is a longitudinal, sectional, exploded view showing the body, seat and seat holder of the diaphragm valve of FIG. 1.
Figure 3:
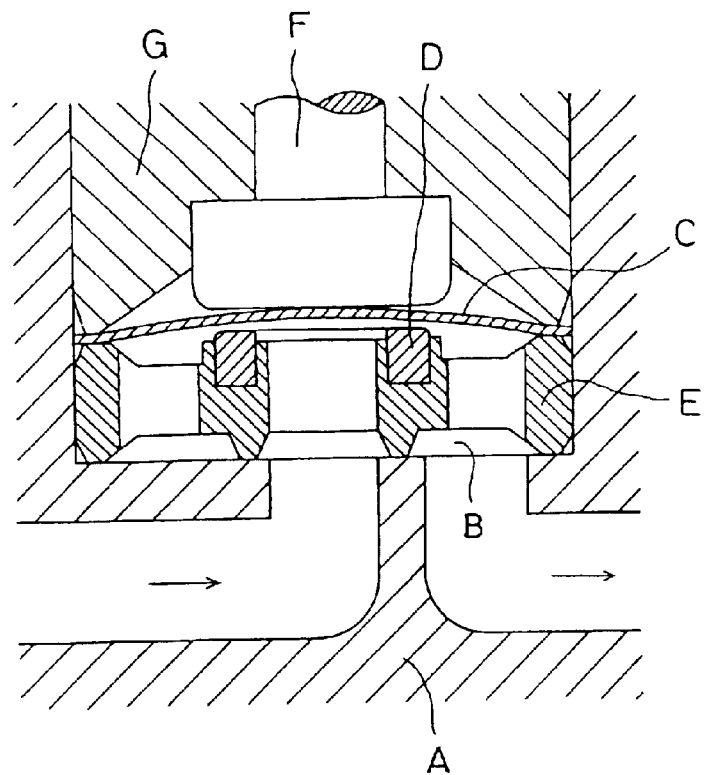
FIG. 3 is a longitudinal, sectional view showing the essential part of a first prior art diaphragm valve in accordance with JP6-341560A.

With reference to FIG. 2, the body 2 has a substantially cylindrical protruding rim 7 around the mouth 8A of the one passageway 8, which rim portion 7 extends axially into the valve chamber 10, terminating remote from the floor surface in a rim end 7B. The floor surface 10C forms an annular seat base 11 circumferentially around the rim portion 7. Circumferentially of the seat base 11, the valve chamber floor surface 10C is further rebated to form an annular seat holder groove 12. The other passageway 9 has a mouth 9A which communicates with the seat holder groove 12. Said protruding rim 7 thus defines part of the inflow path 8 communicating with the valve chamber 10 and has a substantially cylindrical outer surface 7A. The rim portion 7, seat base 11 and seat holder groove 12 are formed substantially concentrically with the inflow path 8.

Said seat base 11 is adapted to support a generally ring-shaped valve seat 3 formed of metal or a synthetic resin material. Said valve seat 3 has first and second opposite, annular sides 3A, 3B and a substantially cylindrical inner surface 3C. As best seen in FIG. 2, the seat 3 further comprises a circumferential, outwardly extending, engaging flange portion 3D juxtaposed said first side 3A such that said seat 3 has a stepped, cylindrical outer surface 3F. In particular, said flange portion 3D defines a step or shoulder 3E in said outer surface 3F of the valve seat 3 towards the second side 3B. Said valve seat 3 is shaped to form a fairly tight or snug fit around the rim portion 7 of the body 2, such that the inner surface 3C of the seat 3 contacts contiguously the outer surface 7A of the rim portion 7. The first side 3A of the seat 3 is substantially coextensive with the seat base 11, such the outer radially extremity of the seat 3 is coterminous with the outer radially extremity of the seat base 11. As best seen in FIG. 1, the seat 3 is also shaped such that when fitted, its second side 3B protrudes slightly from the rim portion 7 into the valve chamber 10.

The seat holder groove 12 is adapted to receive a generally ring-shaped seat holder 4, which may formed of metal. As best seen in FIG. 2, said seat holder 4 has first and second opposite, annular sides 4A, 4B and a generally stepped, cylindrical inner surface 4C which is circumferentially rebated at 4D to form an engaging step or shoulder corresponding to the step or shoulder E on the valve seat 3. The seat holder 4 has a substantially cylindrical outer surface 4E which corresponds to the shape of the inner side surface of the valve chamber 10 and is formed with a plurality of, preferably four, communicating holes 15 adapted to communicate with the mouth 9A of the outflow path 9 formed an the body 2. The thickness of the holder between said first and second sides 4A. 4B is substantially equal to the height of the rim portion 7 plus the depth of the rebated part of the valve chamber floor surface 10C forming the seat holder groove 12. With reference to FIG. 1 the seat holder 4 forms a close fit in the valve chamber 10 with the outer surface 4E of the ring holder contacting or lying closely adjacent the inner side surface of the chamber 10. The first side 4A of the ring holder contacts the floor surface 10C within the seat holder groove 12, and the inner surface 4C forms a tight or snug fit with the outer surface 3F of the valve seat 3. The second side 4B of the seat holder 4 is substantially planar and, when fitted, is substantially co-planar with the rim end of the rim portion 7, such that the second side 4B of the seat also protrudes slightly beyond the second side 3B of the seat holder 4. The rebated portion 4D of the inner surface 4C of the seat holder 4 engages with the step or shoulder 3E of the seat to hold the seat in position on the seat base 11. As seen in FIG. 1, the rebated portion 4D extends radially over the seat base 11 to engage the flange portion 3D of the seat 3.

The inner surface 4C of the seat holder 4 and rim portion 7 of the body thus define an annular recess which receives the valve seat 3. As mentioned above, the inner surface 3C of the seat 3 forms a snug fit with the outer surface 7A of the rim portion 7, and the inner surface 4C of the seat holder 4 forms a snug fit with the outer surface 3F of the seat 3, such that the seat 3 is held firmly between the rim portion 7 and seat holder 4. In some embodiments, the seat 3 may be "pinched" between the rim portion 7 and seat holder 4.

The second side 4B of the seat holder 4 also supports a resiliently flexible, dome-shaped diaphragm 5 within the valve chamber 10 of the kind well known to those skilled in the art. Said diaphragm 5 is tightly clamped around its circumference between the seat holder 4 and a bonnet 16 inserted into the one end 10A of the valve chamber 10 and has a central portion 5A. The diaphragm 5 is held within the valve chamber 10 such that said central portion 5A is disposed juxtaposed the valve seat 3, the curvature of the dome-shaped diaphragm being such that central portion 5A of the diaphragm 5 is normally disposed out of contact with the seat 3. The bonnet 16 is fixedly secured to the body 2 by means of bonnet nuts of the kind well known to those skilled in the art such that the diaphragm 5 is clamped between the seat holder 4 and bonnet 16 to form an air-tight seal.

Said bonnet 16 supports a selectively operable driving member 6 comprising a reciprocating shaft 17 and a head portion 18 which is arranged to contact the diaphragm 5. Said driving member 6 can be selectively operated to drive the shaft 17 into the valve chamber 10 towards the floor surface such that the head portion 18 pushes against the diaphragm 5, causing the diaphragm 5 to deform such that its central portion 5A contacts the second surface 3B of the seat 3. As those skilled in the art will appreciate, the driving member 6 may be operated manually, pneumatically, electromagnetically, electrically or hydraulically. On continued driving of the driving member 6 into the valve chamber 10, the central portion 5A of the diaphragm 5 is pressed firmly against the second side 3B of the seat 3 to form a fluid-tight seal therewith so as to prevent the flow of fluid from the inflow path 8 to the outflow path 9, thereby closing the valve.

In order to re-open the valve, the driving member 6 is driven to move the stem 17 and head portion 18 away from the diaphragm 5, thereby allowing the diaphragm to return to its original position by dint of its natural resilience. The central portion 5A of the diaphragm thus moves away from the second side 3B of the seat 3, and communication between the inflow passage 8 and outflow passage 9 is re-established, thus opening the valve.

The valve seat 3 is a separate component, independent of the body 2 and seat holder 4. Thus, if the seat 3 becomes damaged, then only the seat 3 needs to be replaced. Accordingly, the repair costs associated with the diaphragm valve of the present invention are minimised.

Figure 4:
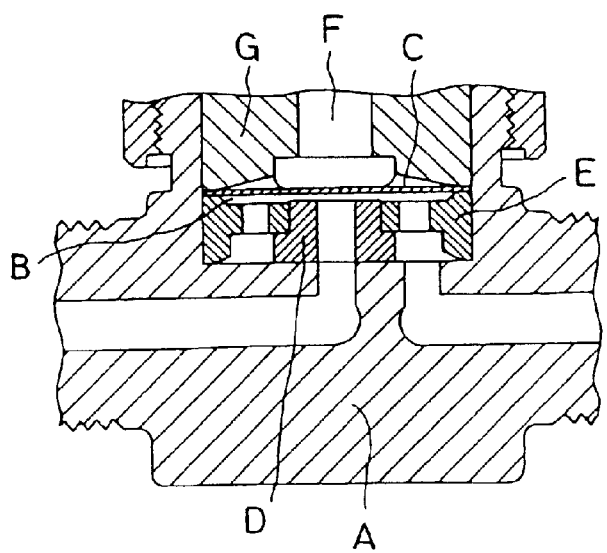
FIG. 4 is a longitudinal, sectional view showing the essential part of a second prior art diaphragm valve according to JP 6-94142A.

By holding the seat 3 firmly between the rim portion 7 and the seat holder 4, the seat 3 is supported at its inner and outer surfaces 3C, 3F thus reinforcing the seat against deformation. Accordingly, when the diaphragm 5 is pushed against the seat 3 by the driving member 6, there is no risk of deformation of the seat 3 as compared with the seat of the prior art diaphragm valve of JP 6-94142A shown in FIG. 4. Thus, the diaphragm valve of the present invention has no risk of leakage between the body 2 and seat 3.

As shown in FIG. 1, the seat base 11 is positioned intermediate the rim end 7B of the rim portion and the rebated seat holder groove 12. However, in other embodiments of the present invention, the seat base 11 may be formed substantially co-planarly with the seat holder groove 12, or the seat base 11 may be rebated further into the valve chamber floor surface 10C than the seat holder groove 12.

The present invention therefore provides a diaphragm valve 1 comprising a body 2, a seat 3, a seat holder 4, a diaphragm 5, a drive member 6 and a rim portion 7. The rim portion 7 is formed on the body 2 circumferentially inside the seat 3, and the seat 3 is held between the rim portion 7 and the seat holder 4. Thus, if the seat holder becomes damaged, then only the seat itself needs replacement thus minimising repair costs. Furthermore, as the rim portion 7 is formed on the body 2 inside the seat 3, the seat 3 is reinforced against deformation when the diaphragm 5 is pressed against the seat 3, thereby producing no risk of leakage from the valve between the body 2 and seat 3.

List of Reference Numerals

1 Diaphragm valve
2 Body
3 Valve seat
3A First side of valve seat
3B Second side of valve seat
3C Cylindrical inner surface of valve seat
3D Flange portion on valve sat
3E Step or shoulder on outer surface of valve seat
3F Outer surface of valve seat
4 Seat holder
4A First side of seat holder
4B Second side of seat holder
4C Inner surface of seat holder
4D Rebated portion of inner surface of seat holder
4E Outer surface of seat holder
5 Diaphragm
5A Central portion of diaphragm
6 Drive member
7 Rim portion
7A Outer surface of rim portion
7B End of rim portion
8 Inflow passage
8A Mouth of inflow passage
9 Outflow passage
9A Mouth of outflow passage
10 Valve chamber
10A One end of valve chamber
10B Other end of valve chamber
10C Floor surface of valve chamber
10D Inner side surface of valve chamber
11 Seat base
12 Seat holder channel
13 Engaging shoulder on valve seat
14 Co-operating shoulder on seat holder
15 Communicating holes
16 Bonnet
17 Stem
18 Head portion of drive member

What is claimed is:

1. A diaphragm valve assembly, comprising:
   a body defining a valve chamber, a first passageway through the body, and a second passageway through the body, wherein the first and second passageways serve as an inlet and an outlet for the valve chamber;
   a removable valve seat installed in the valve chamber around one of the passageways;
   a seat holding means for holding the valve seat in place in the valve chamber, the seat holding means comprising a seat holder that is shaped to surround the valve seat;
   a flexibly resilient diaphragm having a valve closing portion and means for holding the diaphragm in position in the valve chamber, such that the valve closing portion is disposed juxtaposed the valve seat, the diaphragm being shaped such that, when fitted, the valve closing portion is spaced from the valve seat; and
   a selectively operable driving means for driving the valve closing portion of the diaphragm into contact with the valve seat for closing the valve;
   wherein the body further comprises a protruding rim portion around the one of the passageways, wherein the rim portion and the seat holder define a recess adapted to receive the valve seat such that the valve seat is held between the seat holder and the rim portion;
   wherein the body defines a floor surface within the valve chamber, the floor surface comprising a seat supporting surface around the rim portion, the seat supporting surface being adapted to contact and support the valve seat;

wherein the floor surface is recessed around the seat supporting surface to form a seat holder channel adapted to receive the seat holder; and wherein the seat holder channel for receiving the seat holder is formed deeper into the body of the diaphragm valve than the seat supporting surface of the seat base for receiving the valve seat therein.

2. A diaphragm valve assembly as claimed in claim 1, wherein said rim portion defines part of the one passageway communicating with said valve chamber.

3. A diaphragm valve assembly as claimed in claim 1, wherein said rim portion terminates away from said body in a rim end, said seat holder has a substantially planar holder end that faces the diaphragm when fitted and said valve seat has a seat surface that faces the diaphragm when fitted, said rim end and said holder end being substantially co-planar with one another, and said seat surface protruding slightly beyond said rim end and said holder end towards the diaphragm.

4. A diaphragm valve assembly as claimed in claim 1, wherein said valve seat comprises a ring formed of metal or a synthetic resin material.

5. A diaphragm valve assembly as claimed in claim 1, wherein said seat holder comprises a ring formed of metal.

6. A diaphragm valve assembly as claimed in claim 1, wherein said valve seat comprises an outer engaging formation and said seat holder comprises an inner cooperating formation adapted to engage said outer formation for holding the valve seat in position.

7. A diaphragm valve assembly as claimed in claim 1, wherein said seat holder is formed with a plurality of holes adapted to communicate with the other of said passageways.

8. A diaphragm valve assembly as claimed in claim 1, wherein said one passageway forms an inlet.

9. A diaphragm valve assembly, comprising:

a body defining a valve chamber, a first passageway through the body, and a second passageway through the body, wherein the first and second passageways serve as an inlet and an outlet for the valve chamber;

a removable valve seat installed in the valve chamber around one of the passageways;

a seat holding means for holding the valve seat in place in the valve chamber, the seat holding means comprising a seat holder that is shaped to surround the valve seat;

a flexibly resilient diaphragm having a valve closing portion and means for holding the diaphragm in position in the valve chamber, such that the valve closing portion is disposed juxtaposed the valve seat, the diaphragm being shaped such that, when fitted, the valve closing portion is spaced from the valve seat; and a selectively operable driving means for driving the valve closing portion of the diaphragm into contact with the valve seat for closing the valve;

wherein the body further comprises a protruding rim portion around the one of the passageways, wherein the rim portion and the seat holder define a recess adapted to receive the valve seat such that the valve seat is held between the seat holder and the rim portion;

wherein the body defines floor surface within the valve chamber, the floor surface comprising a seat supporting surface around the rim portion, the seat supporting surface being adapted to contact and support the valve seat;

wherein the floor surface is recessed around the seat supporting surface to form a seat holder channel adapted to receive the seat holder;

wherein the one of the passageways is formed substantially centrally within the body and the protruding rim, and the seat supporting surface and said seat holder channel are formed substantially concentrically with the one of the passageways; and wherein the seat holder channel for receiving the seat holder is formed deeper into the body of the diaphragm valve than the seat supporting surface of the seat base for receiving the valve seat therein.

* * * * *